(12) United States Patent
Chakraborty

(10) Patent No.: US 7,437,938 B2
(45) Date of Patent: Oct. 21, 2008

(54) SENSOR WITH COMPOSITE DIAPHRAGM CONTAINING CARBON NANOTUBES OR SEMICONDUCTING NANOWIRES

(75) Inventor: Swapan Chakraborty, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/726,128

(22) Filed: Mar. 21, 2007

(65) Prior Publication Data

US 2008/0229839 A1 Sep. 25, 2008

(51) Int. Cl.
*G01L 7/00* (2006.01)
(52) U.S. Cl. ....................................................... 73/714
(58) Field of Classification Search .................. 73/700, 73/714
See application file for complete search history.

(56) References Cited

U.S. PATENT DOCUMENTS

| | | | |
|---|---|---|---|
| 6,848,320 B2 | 2/2005 | Miyajima et al. | |
| 2002/0130673 A1* | 9/2002 | Pelrine et al. | 324/727 |
| 2004/0001778 A1 | 1/2004 | Chen et al. | |
| 2004/0188780 A1 | 9/2004 | Kurtz | |
| 2005/0036905 A1 | 2/2005 | Gokturk | |
| 2006/0055392 A1* | 3/2006 | Passmore et al. | 324/71.1 |
| 2007/0012094 A1* | 1/2007 | Degertekin et al. | 73/105 |

OTHER PUBLICATIONS

John Liu, Design, Fabrication, and Testing of Piezoresistive Pressure Sensors Using Carbon Nanotubes, Stanford Nanofabrication Facility (2002).
Takao Someya et al., Alcohol Vapor Sensors Based On Single-Walled Carbon Nanotube Field Effect Transistors, Nano Letters vol. 3, No. 7, 877-881 (2003).
Tsu-Wei Chou et al., Nanomechanical Sensors Based On Carbon Nanotube Arrays, NSF Nanoscale Science and Engineering Grantess Conference, Dec. 16-18, 2003.
Paolo Lugli, Plastronics molecular, organic and biological electronics: overview: Micro-Nano Technologies for Space, May 2003.
Jian Wu, Computational Design Of Carbon Nanotube Electromechanical Pressure Sensors, The American Physical Society (2004).
Alexander Star et al., Nanoelectronic Carbon Dioxide Sensors, Advanced Materials 16, No. 22, pp. 2049-2052 (2004).
Randal J. Grow et al., Piezoresistance Of Carbon Nanotubes On Deformable Thin-Film Membranes, Applied Phsics Letters (2005).

(Continued)

*Primary Examiner*—Andre J Allen
(74) *Attorney, Agent, or Firm*—Kinney & Lange, P.A.

(57) ABSTRACT

A sensor preferably capable of high resolution sensing over a large operating range includes a composite diaphragm containing nanotubes or nanowires. The nanotubes or nanowires preferably form a mat that is embedded in insulating material, such as high dielectric or insulating thin films. The nanotubes or nanowires may provide the diaphragm with a Young's modulus of greater than about 1000 GPa and a tensile strength of greater than about 100 GPa. The strain in the nanotubes or nanowires may be measured by a change in resistance, voltage, current or capacitance.

21 Claims, 3 Drawing Sheets

OTHER PUBLICATIONS

Progress Report for ITAS MSFT, Nanoscale Devices and Material Integration: Carbon Nanotube Based Materials for NDE, Apr. 2005.

Prof. Feng Liu, Computational R&D for Industrial Applications, Center for High-Performance Computing, Fall, 2005.

Danvers E. Johnston et al., Electronic Devices Based on Purified Carbon Nanotubes Grown By High Pressure Decomposition of Carbon Monoxide, Feb. 7, 2005.

C. Stampfer et al., Fabrication of Single-Walled Carbon-Nanotube-Based Pressure Sensors, (2006).

Professor Dr. Christofer Hierold, FEM Simulations On Single-Walled Carbon Nanotube Based Pressure Sensor Systems, Mikro-Und Nanosysteme (2006).

hunyu Li, Atomistic Modeling Of Carbon Nanotube-Based Mechanical Sensors, Journal of Intelligent Material Systems and Structures, vol. 17, No. 3, 247-254 (2006).

In-Mook Choi et al., Development Of Low Pressure Sensor Based On Carbon Nanotube Field Emission, Metrologia (2006).

Sinha et al., Carbon Nanotube-Based Sensors, Ingentaconnect (2006).

NASA, Nanoscale Mass Transport and Carbon Nanotube Based Membranes (2006).

Min-Feng Yu et al., Strength and Breaking Mecahnism of Multiwalled Carbon Nanotubes Under Tensile Load, Science, vol. 287, Jan. 28, 2000, pp. 637-640.

Peter Harris, Carbon nanotube science and technology, http://www.personal.rdg.ac.uk/~scsharip/tubes.htm.

* cited by examiner

SENSOR WITH COMPOSITE DIAPHRAGM CONTAINING CARBON NANOTUBES OR SEMICONDUCTING NANOWIRES

BACKGROUND OF THE INVENTION

The present invention relates to sensing devices. In particular, the invention relates to sensing devices utilizing a composite diaphragm in which nanotubes or nanowires are embedded or sandwiched between high dielectric or insulating thin films.

Recent discoveries of nanoscale materials have generated great interest from a technological point of view. Carbon nanotubes (CNT) have attracted attention due to their mechanical, electrical, and thermal properties. Numerous applications of carbon nanotube technology for sensing pressure, temperature, gases, and other parameters have been proposed, using a number of different sensing mechanisms. Semiconducting nanowires of material such as silicon, gallium arsenide, and indium phosphide have been developed, and also have drawn attention for potential sensing applications.

Proposed sensors using carbon nanotubes or semiconducting nanowires are found in the following articles: John Liu, "Design, Fabrication, and Testing of Piezoresistive Pressure Sensors Using Carbon Nanotubes", Stanford Nanofabrication Facility (2002); Takao Someya et al., "Alcohol Vapor Sensors Based On Single-Walled Carbon Nanotube Field Effect Transistors" Nano Letters Vol. 3, No. 7, 877-881 (2003); Tsu-Wei Chou et al., "Nanomechanical Sensors Based On Carbon Nanotube Arrays", NSF Nanoscale Science and Engineering Grantess Conference, Dec. 16-18, 2003; Paolo Lugli, "Plastronics molecular, organic and biological electronics: an overview: Micro-Nano Technologies for Space, May 2003; Jian Wu, "Computational Design Of Carbon Nanotube Electromechanical Pressure Sensors" The American Physical Society (2004); Alexander Star et al., "Nanoelectronic Carbon Dioxide Sensors", Advanced Materials 16, No. 22, pages 2049-2052 (2004); Randal J. Grow et al. "Piezoresistance Of Carbon Nanotubes On Deformable Thin-Film Membranes" Applied Physics Letters (2005); Progress Report for ITAS MSFT "Nanoscale Devices and Material Integration: Carbon Nanotube Based Materials for NDE", April, 2005; Prof. Feng Liu, Computational R&D for Industrial Applications, Center for High-Performance Computing, Fall, 2005; Danvers E. Johnston et al., "Electronic Devices Based on Purified Carbon Nanotubes Grown By High Pressure Decomposition of Carbon Monoxide", Feb. 7, 2005; C. Stampfer et al. "Fabrication of Single-Walled Carbon-Nanotube-Based Pressure Sensors" (2006); Professor Dr. Christofer Hierold "FEM Simulations On Single-Walled Carbon Nanotube Based Pressure Sensor Systems" Mikro-Und Nanosysteme (2006); Chunyu Li "Atomistic Modeling Of Carbon Nanotube-Based Mechanical Sensors" Journal of Intelligent Material Systems and Structures, Vol. 17, No. 3, 247-254 (2006); In-Mook Choi et al., "Development Of Low Pressure Sensor Based On Carbon Nanotube Field Emission" Metrologia (2006); Sinha et al., "Carbon Nanotube-Based Sensors", Ingentaconnect (2006); NASA, "Nanoscale Mass Transport and Carbon Nanotube Based Membranes" (2006).

Sensors using nanotubes or nanowires are also described in Jin U.S. Pat. No. 6,286,226 and Miyajima et al. U.S. Pat. No. 6,848,320, and in Chen et al. Patent Application Publication US 2004/0001778, Kurtz Patent Application Publication US 2004/0188780, and Gokturk Patent Application Publication US 2005/0036905.

BRIEF SUMMARY OF THE INVENTION

A sensor includes a deflectable component having a composite structure formed by a mat of nanotubes or nanowires embedded in insulating material. The nanoscale tubes or wires can provide elastic properties that permit high resolution of pressure sensing over a large pressure range. The composite structure can have a Young's modulus of greater than about 1000 GPa and a tensile strength greater than about 100 GPa.

Deflection of the deflectable component in response to a parameter to be sensed (such as pressure) can be measured using electrodes to produce a sensor signal. The deflection of the component may be measured, for example, by a change in resistance, voltage or capacitance.

DETAILED DESCRIPTION

Figure 1:
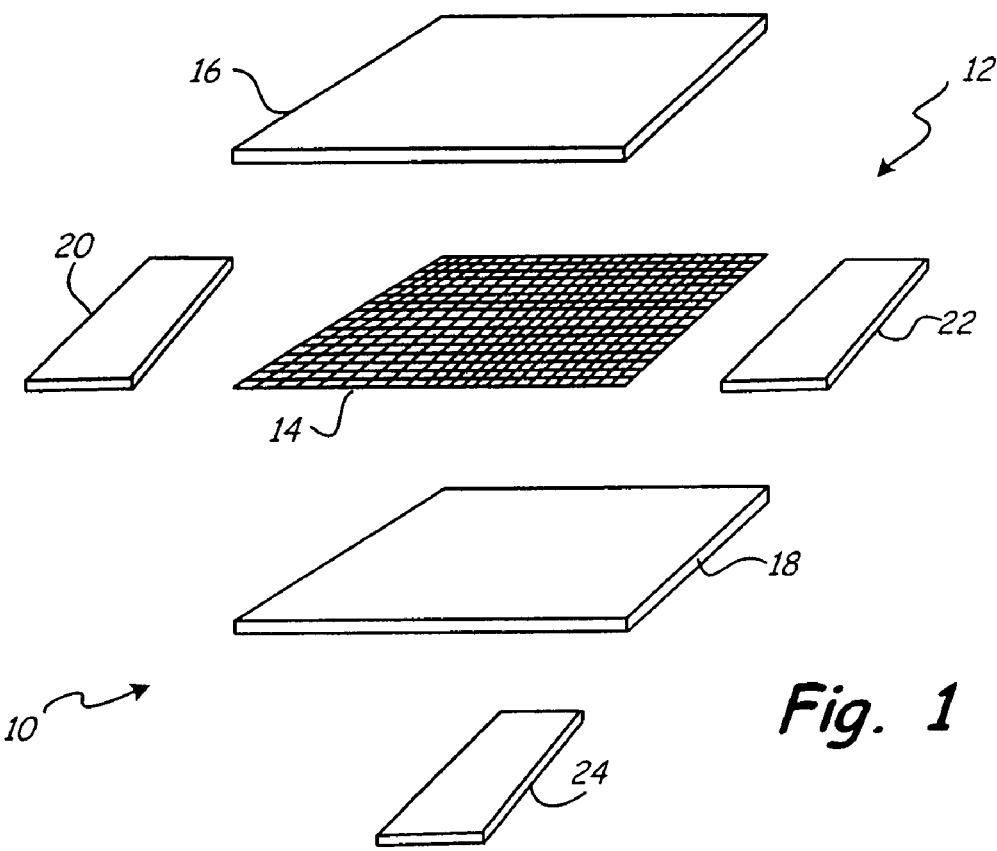
FIG. 1 is an exploded view of a pressure sensor including a diaphragm of nanotubes or nanowires embedded in a dielectric or insulated material.

FIG. 1 shows an exploded view of one embodiment of the invention, in the form of pressure sensor 10, which includes diaphragm 12 formed by nanowire/nanotube mat 14 sandwiched or embedded between dielectric layers 16 and 18, source electrode 20, drain electrode 22 and gate electrode 24.

Mat 14 is formed by multiple carbon nanotubes or semiconducting nanowires arranged in a grid or mesh which may be woven or unwoven. The nanotubes/nanowires may be generally aligned in one direction, or may be aligned in two or more directions. In the embodiment shown in FIG. 1, nanotubes or nanowires semiconducting properties, although in the case of carbon nanotubes some of the nanotubes may be conductors rather than semiconductors. The nanowires/nanotubes are arranged in mat 14 so that there are nanowires/nanotubes extending between source electrode 20 and gate electrode 24.

The nanotubes/nanowires forming mat 14 have a Young's modulus of greater than about 1000 GPa and a tensile strength that is greater than about 100 GPa. These physical characteristics of the nanowires/nanotubes define the elastic modulus and tensile strength of diaphragm 12. In some embodiments, mat 14 is formed of carbon nanotubes and has a Young's modulus of about 1200 GPa and a tensile strength of about 150 GPa.

Dielectric layers 16 and 18 may be a pair of thin films, which are positioned on opposite sides of mat 14 and form a laminated structure in which mat 14 is sandwiched or embedded between layers 16 and 18. Alternatively, the dielectric layers surrounding mat 14 can be formed by thin film deposition processes. Layers 16 and 18 capture mat 14 to maintain structural integrity of diaphragm 12 and to prevent diaphragm 12 from leaking when fluid pressure is applied.

Figure 2:
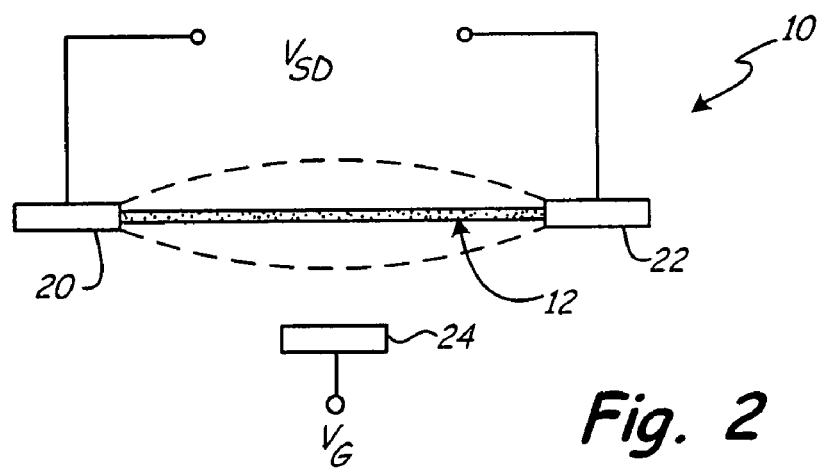
FIG. 2 is a diagram illustrating operation of the pressure sensor of FIG. 1.

FIG. 2 is a diagram illustrating one sensing mechanism of sensor 10. Diaphragm 12 extends between source electrode 20 and drain electrode 22, and is spaced from gate electrode 24. A gate voltage $V_G$ is applied to gate electrode 24. The voltage between source 20 and drain 22 ($V_{SD}$) will vary as a function of gate voltage $V_G$ applied by gate electrode 24 with respect to diaphragm 12.

When pressure is applied to diaphragm 12, the spacing between diaphragm 12 and gate electrode 24 changes. The changing field effect as a result of deflection of diaphragm 12 changes the voltage $V_{SD}$ or resistance between source electrode 20 and drain electrode 22.

Figure 3:
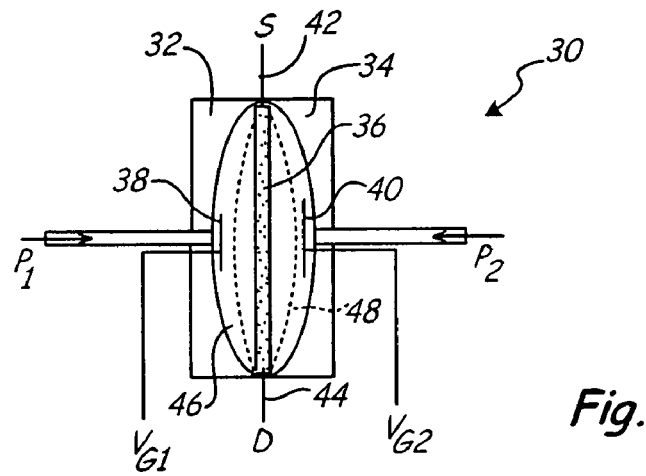
FIG. 3 shows an embodiment of a differential pressure sensor using the nanotube/nanowire embedded diaphragm in which strain in the diaphragm is measured by a change in resistance or voltage between source and drain as a function of applied voltage.

Pursuant to another embodiment, FIG. 3 shows differential pressure sensor 30, which includes cell halves 32 and 34, central diaphragm 36, gate electrodes 38 and 40, source electrode 42, and drain electrode 44. Central diaphragm 36 is a composite diaphragm, like diaphragm 12 of FIG. 1, in which a mat of semiconducting nanowires/nanotubes is sandwiched or embedded in dielectric or insulating material.

Cell halves 32 and 34 and central diaphragm 36 divide the interior of sensor 30 into first pressure chamber 46 and second pressure chamber 48. Fluid pressure $P_1$ is applied to chamber 46, while pressure $P_2$ is applied to chamber 48. Deflection of central diaphragm 36, therefore, is a function of the difference in pressure $\Delta P = P_1 - P_2$.

Gate voltage $V_{G1}$ is applied to gate electrode 40, while gate voltage $V_2$ is applied to gate electrode 38. The resistance or voltage between source electrode 42 and drain electrode 44 can be measured to provide an indication of differential pressure $\Delta P$.

Figure 4:
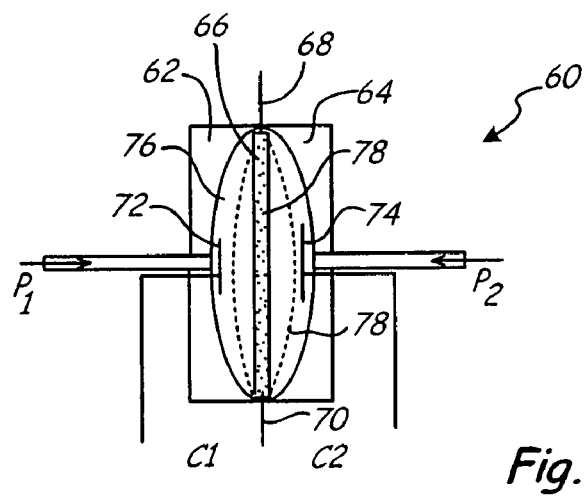
FIG. 4 shows an embodiment of a capacitive differential pressure sensor in which the embedded nanowire/nanotube diaphragm acts as a common plate of two sensing capacitances.

FIG. 4 shows differential pressure sensor 60, which is a capacitive type differential sensor. Sensor 60 includes cell halves 62 and 64, central diaphragm 66, diaphragm electrodes 68 and 70, and capacitor electrodes 72 and 74.

Central diaphragm 66 divides the space between cell halves 62 and 64 into first pressure sensing chamber 76 and second pressure sensing chamber 78. The nanowires or nanotubes within central diaphragm 66 can be semiconducting or can be conductive. A first sensing capacitance $C_1$ is formed between electrode 72 in chamber 76 and diaphragm electrodes 68 and 70. Sensing capacitance $C_2$ is formed between electrode 74 in chamber 78 and diaphragm electrodes 68 and 70. The two capacitances $C_1$ and $C_2$ will vary as a function of differential pressure. The two capacitances are converted to an output by signal processing circuitry to provide an indication of differential pressure.

Figure 5:
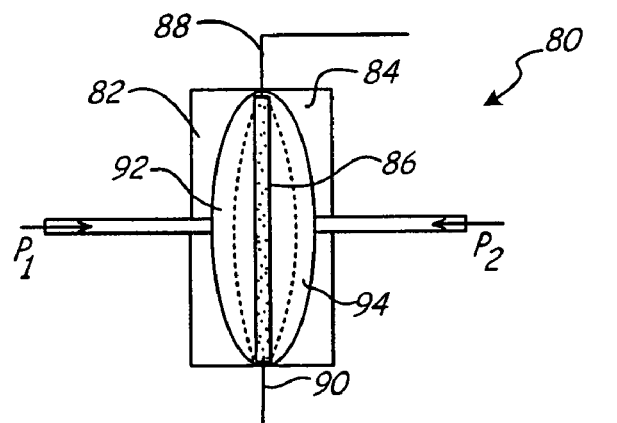
FIG. 5 shows an embodiment of a differential pressure sensor in which differential pressure is sensed as a function of resistance of the nanotube/nanowire embedded diaphragm.

FIG. 5 shows differential pressure sensor 80, which includes cell halves 82 and 84, diaphragm 86, and diaphragm electrodes 88 and 90. Central diaphragm 88 divides the interior of pressure sensor 80 into sensing chambers 92 and 94.

In the embodiment shown in FIG. 5, the variation in resistance as a function of strain on diaphragm 86 is used to sense differential pressure. Resistance between electrodes 88 and 90 will change as a function of deflection of diaphragm 86. The deflection is a function of differential pressure. The nanowires or nanotubes within diaphragm 86 can be either semiconducting or conducting, or a mixture of the two.

Figure 6:
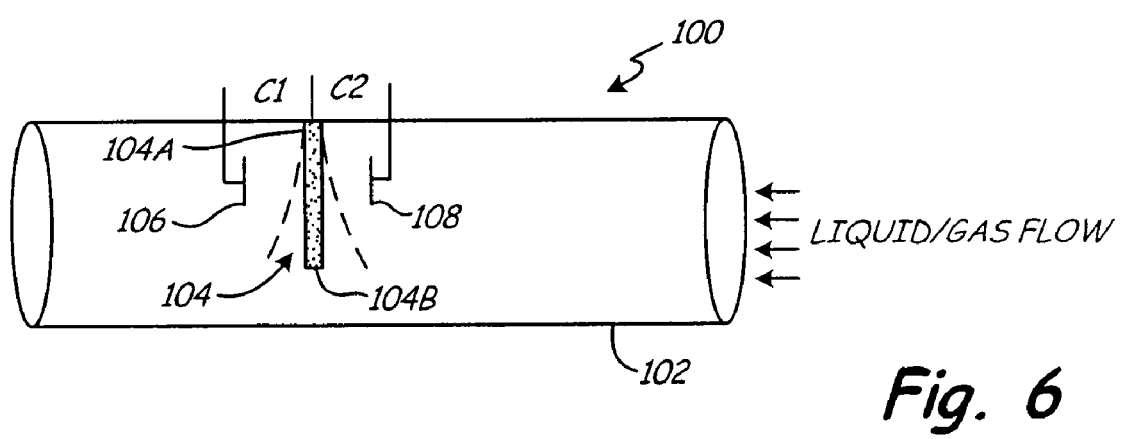
FIG. 6 shows a flow sensor having a deflectable composite structure with a nanotube/nanowire mat.

FIG. 6 shows flow sensor 100, which includes fluid flow passage 102, deflectable component 104, and capacitor plates 106 and 108. Deflectable component 104 is a composite structure of a nanotube/nanowire mat embedded between dielectric layers. Deflectable component 104 is attached to flow passage 102 at fixed end 104A, while free end 104B is movable based upon fluid flow through passage 102. Deflectable component 104 and capacitor plate 106 form a first capacitance C1, while component 104 and capacitor plate 108 form a second capacitance C2. The relative values of C1 and C2 are a function of the direction and flow rate of fluid passing through passage 102.

In each of the embodiments, unique physical characteristics of nanotubes and nanowires provide unique and highly advantageous sensor properties. The high Young's modulus provided by a mat of nanowires/nanotubes provides much higher resolution pressure sensing. The high yield strength provides a sensor of greater strength which can withstand much higher operating pressures. As a result, a pressure sensor capable of sensing pressures ranging from 10 psi to 10,000 psi can be achieved.

A deflectable component with embedded nanowires/nanotubes offers a very light weight construction, while providing high tensile strength. The component can be used to sense absolute pressure, differential pressure, gauge pressure, or flow rate. It can also be used to measure other parameters, such as temperature and level.

Although the present invention has been described with reference to preferred embodiments, workers skilled in the art will recognize that changes may be made in form and detail without departing from the spirit and scope of the invention.

The invention claimed is:

1. A sensor comprising:
   a composite structure formed by a mat of nanotubes or nanowires embedded in insulating material, wherein the composite structure has a Young's modulus of greater than about 1000 GPa; and
   electrodes for deriving a sensor signal in response to deflection of the composite structure in response to a physical parameter, at least one of the electrodes connected to the mat.

2. The sensor of claim 1, wherein the composite structure has a tensile strength of greater than about 100 GPa.

3. The sensor of claim 2, wherein the composite structure has a Young's modulus of about 1200 GPa and a tensile strength of about 150 GPa.

4. The sensor of claim 1 and further comprising:
   a housing for supporting the composite structure to define a pressure sensing chamber.

5. The sensor of claim 1, wherein the electrodes include a source electrode and a drain electrode connected to the mat and a gate electrode spaced from the composite structure.

6. The sensor of claim 1, wherein the mat comprises carbon nanotubes.

7. The sensor of claim 1, wherein the mat comprises semiconducting nanowires.

8. The sensor of claim 1, wherein the electrodes include a first electrode connected to the mat and a second electrode spaced from the composite structure.

9. The sensor of claim 1, wherein the electrodes include first and second electrodes connected to opposite ends of the mat.

10. The sensor of claim 1, wherein the insulating material comprises a dielectric layer.

11. The sensor of claim 1, wherein the sensor signal is representative of a resistance, voltage, current, or capacitance as a function of strain in the mat of nanowires or nanotubes.

12. The sensor of claim 1, wherein the sensor signal is representative of a measured pressure, flow, temperature or level.

13. A pressure sensor comprising:

a housing;

a diaphragm supported by the housing and deflectable in response to pressure, the diaphragm comprising nanoscale material having a Young's modulus of greater than about 1000 GPa and a tensile strength of greater than about 100 Gpa; and first and second electrodes connected to the diaphragm.

14. The pressure sensor of claim 13, wherein the diaphragm comprises a mat of nanowires or nanotubes embedded in an insulating material.

15. The pressure sensor of claim 14, wherein the mat is comprised of at least one of carbon nanotubes and semiconducting nanowires.

16. The pressure sensor of claim 14, wherein the mat is sandwiched between layers of dielectric material.

17. The pressure sensor of claim 11 and further comprising:

a gate electrode supported by the housing and spaced from the diaphragm by a distance that varies as a function of pressure applied to the diaphragm.

18. The pressure sensor of claim 13, wherein the diaphragm and a first portion of the housing define a first pressure sensing chamber.

19. The pressure sensor of claim 18, wherein the diaphragm and a second portion of the housing define a second pressure sensing chamber on an opposite side of the diaphragm from the first pressure sensing chamber.

20. The pressure sensor of claim 13, wherein the nanoscale material has a Young's modulus of about 1200 GPa.

21. The pressure sensor of claim 13, wherein the nanoscale material has a tensile strength of about 150 GPa.

* * * * *